(12) United States Patent
Xiong et al.

(10) Patent No.: US 9,140,858 B2
(45) Date of Patent: Sep. 22, 2015

(54) WATERPROOF OPTICAL FIBER CONNECTOR AND OUTDOOR COMMUNICATION DEVICE

(71) Applicant: Huawei Technologies Co., Ltd., Shenzhen, Guangdong (CN)

(72) Inventors: Tengfang Xiong, Shenzhen (CN); Wei Wang, Shenzhen (CN); Baoliang Sun, Shenzhen (CN); Jianguo Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 13/757,293

(22) Filed: Feb. 1, 2013

(65) Prior Publication Data

US 2013/0148928 A1    Jun. 13, 2013

Related U.S. Application Data

(63) Continuation of application No. PCT/CN2011/073776, filed on May 6, 2011.

(30) Foreign Application Priority Data

Aug. 2, 2010  (CN) .......................... 2010 1 0244567

(51) Int. Cl.
*G02B 6/36* (2006.01)
*G02B 6/38* (2006.01)
*G02B 6/42* (2006.01)

(52) U.S. Cl.
CPC ............... *G02B 6/36* (2013.01); *G02B 6/3887* (2013.01); *G02B 6/3816* (2013.01); *G02B 6/3893* (2013.01); *G02B 6/3894* (2013.01); *G02B 6/3897* (2013.01); *G02B 6/4292* (2013.01)

(58) Field of Classification Search
None
See application file for complete search history.

(56) References Cited

U.S. PATENT DOCUMENTS

2007/0036487 A1    2/2007  Grzegorzewska et al.
2008/0175546 A1*   7/2008  Lu et al. .......................... 385/92
(Continued)

FOREIGN PATENT DOCUMENTS

CN    2639911 Y    9/2004
CN    101243345 A   8/2008
(Continued)

OTHER PUBLICATIONS

Extended European Search Report in corresponding European Patent Application No. 11814045.8 (Apr. 10, 2013).
(Continued)

*Primary Examiner* — Sung Pak
(74) *Attorney, Agent, or Firm* — Leydig, Voit & Mayer, Ltd.

(57) ABSTRACT

A waterproof optical fiber connector includes a flange and a terminal connector. The terminal connector includes an outer casing, an inner casing, an optical fiber and a connecting component coupled with the fiber. The inner casing is tubular for housing the fiber and the connecting component. The outer casing is tubular for housing the inner casing. The inner casing includes a body and a waterproof clip connected to a back end of the body. The fiber passes through the clip. The tail of the inner wall of the outer casing tapers from the front to the back, pressing the clip inwards such that the clip and the fiber are fixed together. At least one first protrusion is provided on the inner surface of the front end of the sleeve of the flange, and the front end of the body of the inner casing bears against the first protrusion.

14 Claims, 12 Drawing Sheets

(56) References Cited

U.S. PATENT DOCUMENTS

| | | | |
|---|---|---|---|
| 2009/0148101 A1* | 6/2009 | Lu et al. | 385/56 |
| 2011/0123157 A1* | 5/2011 | Belsan et al. | 385/75 |
| 2014/0086534 A1* | 3/2014 | Lu et al. | 385/60 |
| 2014/0318856 A1* | 10/2014 | Carman | 174/655 |
| 2015/0003784 A1* | 1/2015 | Islam | 385/62 |

FOREIGN PATENT DOCUMENTS

| | | |
|---|---|---|
| CN | 201145752 Y | 11/2008 |
| CN | 201233463 Y | 5/2009 |
| CN | 101635410 A | 1/2010 |
| CN | 101907752 A | 12/2010 |
| CN | 201707478 U | 1/2011 |
| WO | WO 03/050579 A2 | 6/2003 |

OTHER PUBLICATIONS

1st Office Action in corresponding Chinese Patent Application No. 201010244567.5 (Jun. 9, 2011).

International Search Report in corresponding International Patent Application No. PCT/CN2011/073776 (Aug. 11, 2011).

Written Opinion of the International Searching Authority in corresponding International Patent Application No. PCT/CN2011/073776 (Aug. 11, 2011).

Written Opinion of the International Searching Authority in corresponding PCT Patent Application No. PCT/CN2011/073776 (Aug. 11, 2011).

International Search Report in corresponding PCT Patent Application No. PCT/CN2011/073776 (Aug. 11, 2011).

* cited by examiner

FIG. 1

(RELATED ART)

FIG. 2

(RELATED ART)

WATERPROOF OPTICAL FIBER CONNECTOR AND OUTDOOR COMMUNICATION DEVICE

CROSS-REFERENCE TO RELATED APPLICATIONS

This application is a continuation of International Patent Application No. PCT/CN2011/073776, filed on May 6, 2011, which claims priority to Chinese Patent Application No. 201010244567.5, filed on Aug. 2, 2010, both of which are hereby incorporated by reference in their entireties.

FIELD OF THE INVENTION

The present disclosure relates to the field of optical fibre connector techniques, and more specifically, relates to a waterproof optical fibre connector and an outdoor communication device.

DESCRIPTION OF THE RELATED ART

With the continuous development of communication technology, optical fibre communication has become more popular. Thus, connections between communication devices and communication optical fibres are usually required. Devices e.g., waterproof optical fibre connectors, for implementing such connections will directly affect communication quality and product costs, and thus have attracted a lot of interest in the related art field.

Figure 1:
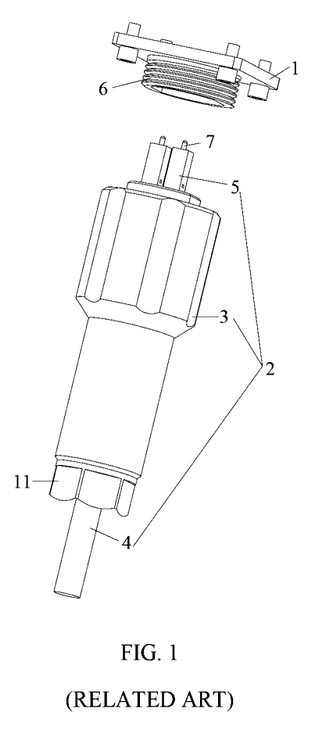
FIG. 1 is a structural illustration of a flange and a terminal connector in the prior art.
Figure 2:
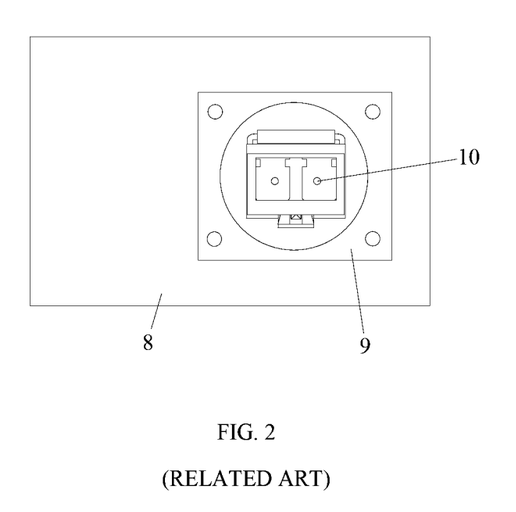
FIG. 2 is a top-view structural illustration of an optical module of a communication device in the prior art.

As shown in FIG. 1, a currently typical waterproof optical fibre connector mainly includes a flange 1 and a terminal connector 2. The terminal connector 2 includes an outer casing 3, an optical fibre 4 and a connecting component 5 coupled with the optical fibre 4. A raised sleeve 6 is provided on the back face of the flange 1, with a first fastening feature provided on the outer surface of the sleeve 6. A second fastening feature, capable of matching with the first fastening feature, is provided on the inner surface of the forepart of the outer casing 3 (here in the direction from the outer casing 3 to the flange 1 is defined as forward direction). The flange 1 and the outer casing 3 are screwed together by the first fastening feature and the second fastening feature. The optical fibre 4 and the connecting component 5 are housed within the chamber of the outer casing 3. The connecting component 5 and the outer casing 3 are fixed together. The head of the connecting component 5 includes two pins 7 which can fit into sockets 10 in an optical module 9 of a communication device 8 as shown in FIG. 2, thereby establishing a well connection in optical link. The tail of the outer casing 3 is a waterproof clip formed of elastic material and surrounding the outer surface of the optical fibre 4. A nut 11 is provided outside the waterproof clip, such that the waterproof clip and the optical fibre 4 are fixed together by screwing the nut 11, thereby getting a waterproof ability.

The process of installing the above-mentioned waterproof optical fibre connector on the communication device is as follows: mounting the flange 1 in a position on the housing of the communication device 8 that corresponds to the optical module 9, screwing the nut 11, and then screwing the forepart of the outer casing 3 on the sleeve 6 of the flange 1, thereby completing the installation of the waterproof optical fibre connector.

During the study and practice of the existing techniques, the inventor of the present disclosure has found that, the connecting component and the outer casing are fixed together such that the pins in the connecting component have fixed positions on the plane where the flange is located, but the respective sockets on optical modules having different specifications have different positions on the plane where the flange is located, making it difficult for the pins to fit into sockets of optical modules having different specifications. Therefore, it is hard for the existing waterproof optical fibre connector to be compatible with optical modules having different specifications.

SUMMARY OF THE INVENTION

Embodiments of the present disclosure provide a waterproof optical fibre connector and an outdoor communication device, which can be compatible with optical modules having different features.

Embodiments of the present disclosure provide a waterproof optical fibre connector including a flange and a terminal connector. The terminal connector includes an outer casing, an optical fibre and a connecting component coupled with the optical fibre. The optical fibre and the connecting component are housed within the chamber of the outer casing, and the flange and the outer casing are screwed together, wherein the connecting component and the outer casing are separated from each other.

Embodiments of the present disclosure provide an outdoor communication device including the above-mentioned waterproof optical fibre connector.

As can be known from the above technical solution, compared with the existing techniques, the embodiments of the present disclosure have the following benefits.

In the embodiments of the present disclosure, since the connecting component and the outer casing are separated from each other, the pins of the connecting component can have variable positions on a plane where the flange is located, which can therefore adapt to sockets on optical modules having different features. During the installation, the connecting component and the optical fibre that are coupled together can firstly be connected to the optical module by fitting the pins of the connecting component into the sockets of the optical module, and then the outer casing and the flange are screwed together. Therefore, the waterproof optical fibre connector according to the embodiments of the present disclosure can be compatible with optical modules having different specifications.

BRIEF DESCRIPTION OF THE DRAWINGS

In order to more clearly describe the technical solutions in the embodiments of the present disclosure or in the prior art, the accompanying drawings that need to be used in the embodiments or in the prior art are briefly introduced. Obviously, these accompanying drawings are merely some embodiments of the present disclosure, and for one of ordinary skill in the art, other drawings can be obtained based on these accompanying drawings without paying any creative efforts.

DESCRIPTION OF THE EMBODIMENTS

The embodiments of the present disclosure provide a waterproof optical fibre connector and an outdoor communication device, which can be compatible with optical modules having different specifications.

Embodiment 1

According to an embodiment of the present disclosure, a waterproof optical fibre connector includes a flange and a terminal connector. The terminal connector includes an outer casing, an optical fibre and a connecting component coupled with the optical fibre. The optical fibre and the connecting component are housed within the chamber of the outer casing, and the flange and the outer casing are screwed together, wherein the connecting component and the outer casing are separated from each other.

The head of the connecting component includes two pins which can fit into sockets of an optical module of a communication device, thereby establishing well connected optical link.

The tail of the outer casing can be a waterproof clip formed of elastic material and surrounding the outer surface of the optical fibre. A nut is provided outside the waterproof clip, such that the waterproof clip and the optical fibre are fixed together by screwing the nut, thereby achieving a waterproof function.

As can be known from the above, in this embodiment, since the connecting component and the outer casing are separated from each other, the pins of the connecting component can have variable positions on a plane where the flange is located, which can therefore adapt to sockets of optical modules having different specifications. During the installation, the connecting component and the optical fibre that are coupled together can firstly be connected to the optical module by fitting the pins of the connecting component into the sockets of the optical module, and then the outer casing and the flange are screwed together. Therefore, the waterproof optical fibre connector according to the embodiments of the present disclosure can be compatible with optical modules having different specifications.

Embodiment 2

For the waterproof optical fibre connector in Embodiment 1, since the optical fibre and the waterproof clip of the outer casing are fixed together by a nut, if this nut is not firstly loosened but the outer casing is directly unscrewed and pulled outward during the replacement of the waterproof optical fibre connector, then the connecting component will be pulled outward as well, which pronely damages the connecting component. In practice, a maintenance man is usually not the initial installation man, and thus, if the maintenance man does not know the nut should be firstly loosened but directly unscrews the outer casing and pulls it outwards, then the connecting component is prone to be damaged. Therefore, the present disclosure provides a further embodiment of the waterproof optical fibre connector.

Below, the further embodiment of the waterproof optical fibre connector of the present disclosure will be described in detail in conjunction with FIGS. 3 to 14.

In the embodiment of the present disclosure, it is defined that, after the waterproof optical fibre connector is mounted on a communication device, the direction pointing to the communication device is forward while the direction opposite thereto is backward.

Figure 3:
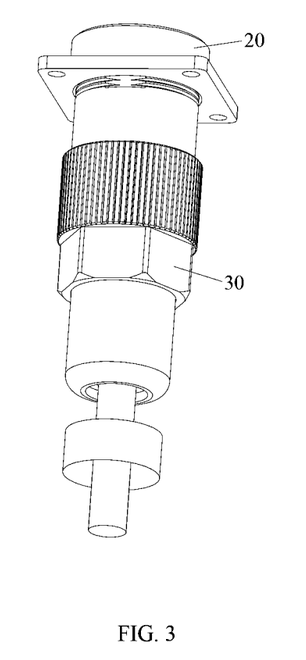
FIG. 3 is a structural illustration of a waterproof optical fibre connector according to a further embodiment of the present disclosure.
Figure 4:
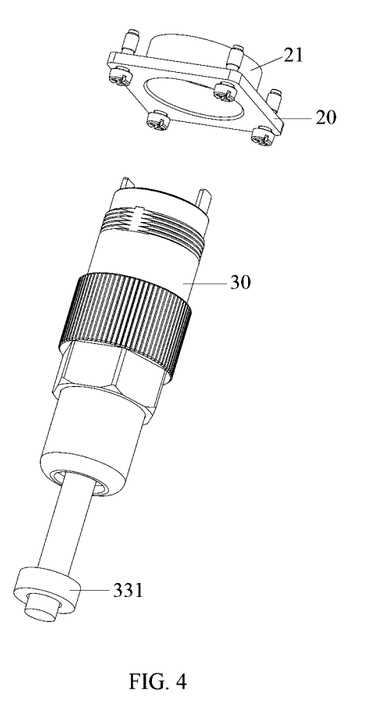
FIG. 4 is a structural illustration of a flange and a terminal connector in the embodiment shown in FIG. 3.
Figure 5:
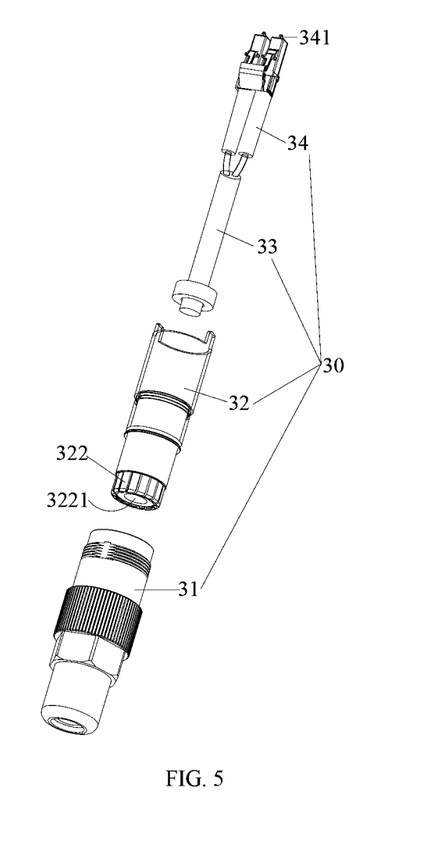
FIG. 5 is an exploded structural illustration of the terminal connector in the embodiment shown in FIG. 3.

As shown in FIGS. 3 to 5, the waterproof optical fibre connector includes a flange 20 and a terminal connector 30. The terminal connector 30 includes an outer casing 31, an inner casing 32, an optical fibre 33 and a connecting component 34 coupled with the optical fibre 33. The head of the connecting component 34 has two pins 341 which can fit into sockets of an optical module.

Figure 6:
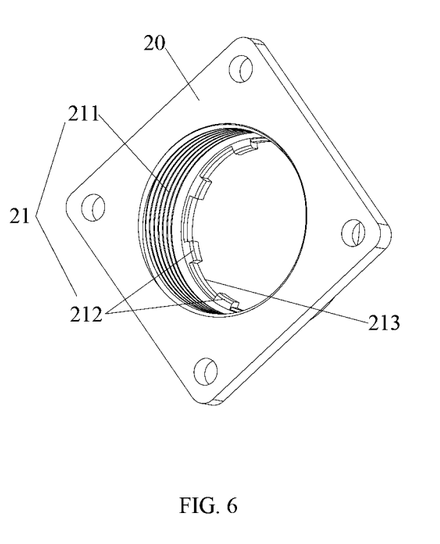
FIG. 6 is an enlarged structural illustration of the flange in the embodiment shown in FIG. 3.
Figure 8:
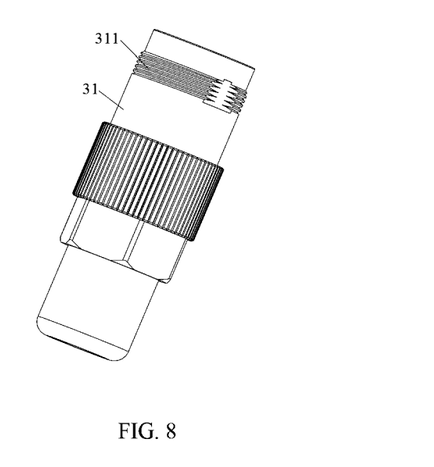
FIG. 8 is a structural illustration of an outer casing in the embodiment shown in FIG. 3.

As shown in FIG. 6, there is a raised sleeve 21 on the front face of the flange 20, and a first fastening feature 211 is provided on the inner surface of the sleeve 21. As shown in FIGS. 4, 5 and 8, on the outer surface of the forepart of the outer casing 31, there provides a second fastening feature 311 that can cooperate with the first fastening feature 211. As can be known in conjunction with FIG. 3, the flange 20 and the outer casing 31 can be screwed together by the first fastening feature 211 and the second fastening feature 311.

Figure 9:
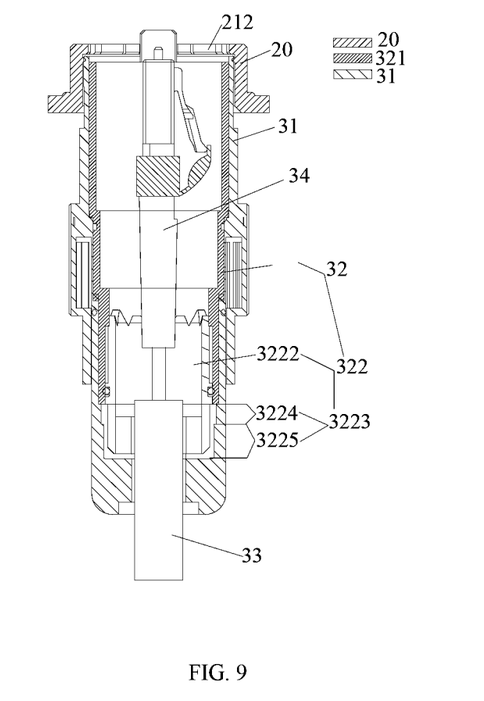
FIG. 9 is a sectional view of the waterproof optical fibre connector in the embodiment shown in FIG. 3.

As shown in FIGS. 5 and 9, the inner casing 32 is tubular within which the optical fibre 33 and the connecting component 34 can be housed, the outer casing 31 is tubular within which the inner casing 32 can be housed. The inner casing 32 is housed within the tube of the outer casing 31, and the optical fibre 33 and the connecting component 34 are houses within the tube of the inner casing 32. The inner casing 32 includes a body 321 and a waterproof clip 322 connected to the back end of the body 321. Both the body 321 of the inner casing 32 and the outer casing 31 are made of hard materials. The waterproof clip 322 is made of an elastic material and has a hole 3221 which allows the optical fibre 33 to pass through. The optical fibre 33 passes through the waterproof clip 322.

As shown in FIGS. 6 and 9, on the inner surface of the front end of the sleeve 21 of the flange 20, there provides at least one first protrusion 212 for stopping the inner casing 32. The front end of the body 321 of the inner casing 32 will bear against the first protrusion 212.

Figure 7:
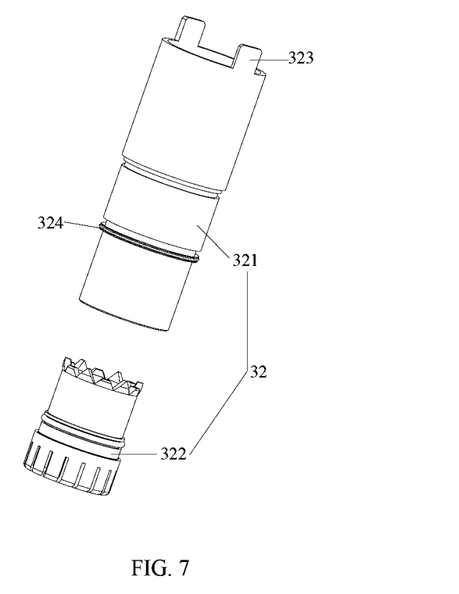
FIG. 7 is an exploded structural illustration of an inner casing in the embodiment shown in FIG. 3.

As shown in FIG. 7, the waterproof clip 322 of the inner casing 32 includes a rubber plug 3222 plugged in the body 321 of the inner casing 32 and a clip portion 3223 outside the body 321 of the inner casing 32.

As shown in FIG. 9, the tail of the inner wall of the outer casing 31 tapers from the front to the back, and the waterproof clip 322 is pressed inwards by the tail such that the waterproof clip 322 and the optical fibre 33 are fixed together, thereby getting a waterproof ability.

The installation method of the waterproof optical fibre connector in the embodiments of the present disclosure will be described below in detail in conjunction with FIGS. 10 to 13.

The process of installing the waterproof optical fibre connector in the embodiments of the present disclosure on the communication device includes:

101) Mounting the flange 20 to a position of the housing of the communication device 40 that corresponds to the optical module 50.

Figure 10:
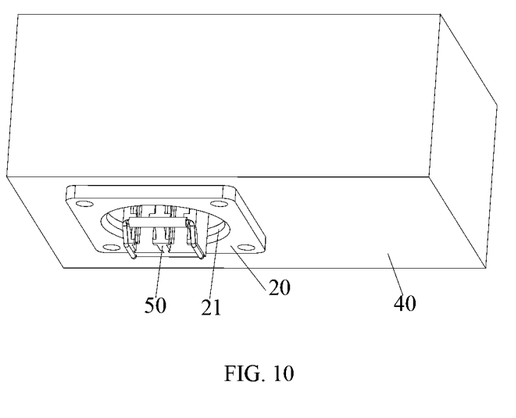
FIG. 10 is a structural illustration when the flange is mounted on the communication device according to an embodiment of the present disclosure.

As shown in FIG. 10, after step 101, the sleeve 21 of the flange 20 is mounted inside the communication device 40 and the optical module 50 juts out from the sleeve.

102) Putting the optical fibre and the connecting component that are coupled together inside the inner casing of the terminal connector, and putting the inner casing inside the outer casing of the terminal connector, thereby completing the assembly of the terminal connector.

Figure 11:
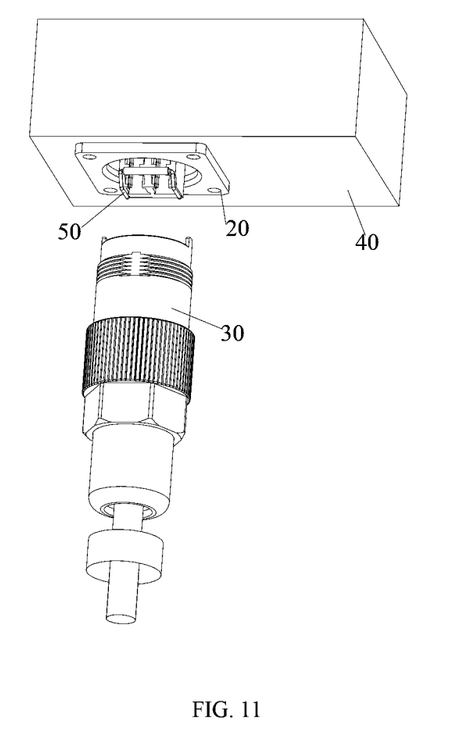
FIG. 11 is a structural illustration after the terminal connector is assembled on the basis of FIG. 10.

The entire structure after step 102 is shown in FIG. 11. In FIG. 11, the optical module 50, the flange mounted on the communication device 40 and the assembled terminal connector 30 are shown.

103) Fitting the two pins of the connecting component 34 into the two sockets of the optical module 50.

Figure 12:
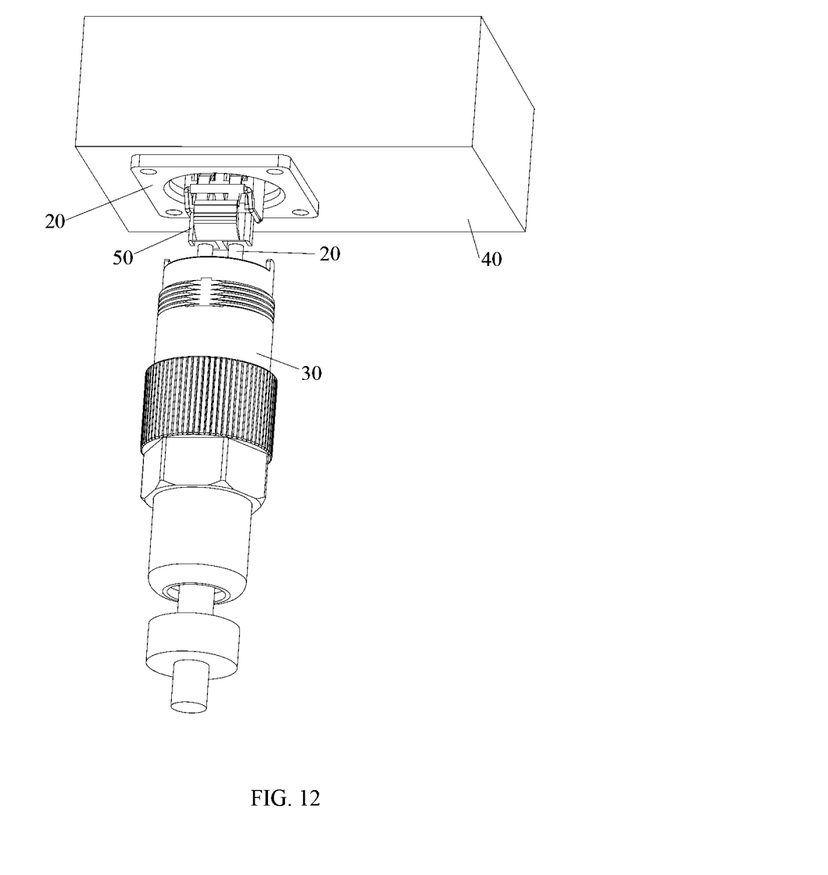
FIG. 12 is a structural illustration after the pins of the connecting component fit into the sockets of the optical module on the basis of FIG. 11.

As shown in FIG. 12, after step 103, the connecting component 34 of the terminal connector 30 butts against the optical module 50 on the communication device 40.

Here, it should note that there is no necessary sequencing among steps 101, 102 and 103.

104) Inserting the foreparts of the inner casing and the outer casing into the sleeve of the flange, and screwing the forepart of the outer casing with the sleeve of the flange by means of the second fastening feature of the outer casing and the first fastening feature of the flange, such that the front end of the inner casing bears against the first protrusion on the front end of the flange and the tail of the outer casing presses the waterproof clip inwards, thereby completing the installation of the waterproof optical fibre connector.

Figure 13:
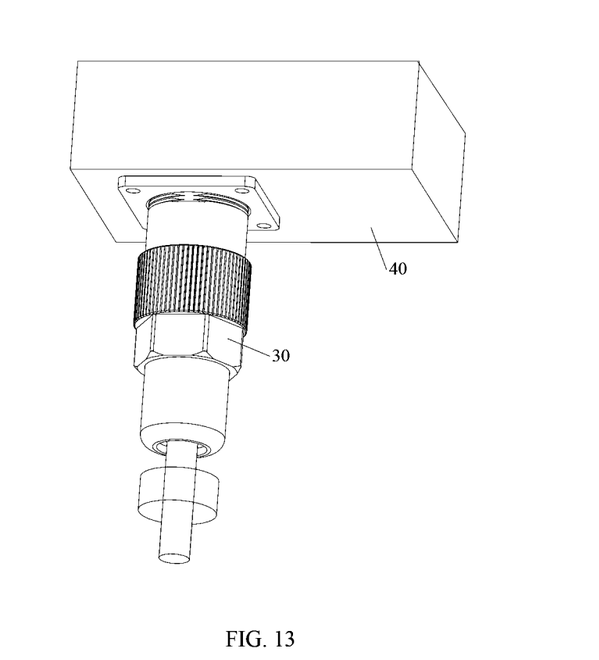
FIG. 13 is a structural illustration after the inner casing and the outer casing are mounted on the communication device and the installation of the waterproof optical fibre connector is completed on the basis of FIG. 12.

As shown in FIG. 13, after step 104, the terminal connector 30 is fixed on the communication device 40.

In step 104, with the inner casing 32 housed inside the tube of the outer casing 31, the forepart of the outer casing 31 and the sleeve of the flange 20 are screwed together by means of the first and second fastening features, such that the front end of the inner casing 32 bears against the first protrusion of the front end of the flange 20 and the outer casing 31 moves forward relative to the waterproof clip 322. Since the tail of the inner wall of the outer casing 31 tapers from the front to the back, the tail of the outer casing 31 presses the waterproof clip 322 inwards during the outer casing 31 moving forward relative to the waterproof clip 322, and thus the waterproof clip 322 and the optical fibre 33 are fixed together, achieving a waterproof effect. As shown in FIG. 9, after the forepart of the outer casing 31 and the sleeve of the flange are screwed together, the back portion 3225 of the clip portion 3223 of the waterproof clip 322 is pressed inwards by the outer casing 31 to a greater extent than the front portion 3224 of the clip portion 3223 of the waterproof clip 322.

As can be known from the above, in this embodiment, the waterproof clip is provided on the inner casing, and the outer casing and the flange are screwed together such that the outer casing presses against the waterproof clip of the inner casing to fix the waterproof clip and the optical fibre together. Thus, during the replacement of the waterproof optical fibre connector, if the outer casing is directly unscrewed and pulled outwards, the outer casing is moving backward relative to the waterproof clip of the inner casing as the outer casing is being unscrewed. Considering the fact that the tail of the inner wall of the outer casing tapers from the front to the back, during the process of screwing off the outer casing, the outer casing loosens the waterproof clip, the waterproof clip separates from the optical fibre, and the outer casing also separates from the optical fibre. Therefore, during the replacement of the waterproof optical fibre connector, it is possible to directly unscrew the outer casing and pull it outwards but not cause the connecting component to be pulled outwards together with the outer casing, thereby protecting the connecting component from being damaged.

In addition, during the process of screwing the outer casing and the flange together, the rotation of the outer casing induces the rotation of the inner casing, and the rotation of the waterproof clip at the tail of the inner casing in turn induces the torsion of the optical fibre, which consequently causes the joint between the optical fibre and the connecting component apt to be twisted off. In order to address this problem, optionally, as shown in FIG. 6, at least two first protrusions 212 are provided on the front end of the sleeve 21 of the flange 20. Moreover, as shown in FIG. 7, at least one second protrusion 323 is provided on the front end of the inner casing 32, and the second protrusion 323 can fit in the gap 213 that is formed between two adjacent first protrusions 212. Furthermore, in step 104, when the forepart of the inner casing 32 is inserted into the sleeve 21 of the flange 20, the second protrusion 323 is inserted into the gap 213 such that the inner casing is fixed relative to the flange and thus will not rotate with the rotation of the outer casing. Thereby the joint between the optical fibre 33 and the connecting component 34 can be prevented from being twisted off.

Optionally, as shown in FIG. 9, the waterproof clip 322 of the inner casing 32 contacts the tail of the outer casing 31, and the body portion 321 of the inner casing 32 also contacts the outer casing 31. In conjunction with FIG. 7, a first waterproof ring 324 is provided on the middle portion of the inner casing 32 for achieving a better waterproof effect.

Figure 14:
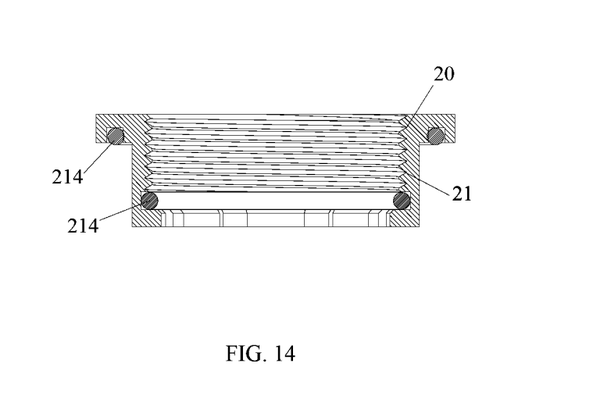
FIG. 14 is a sectional view of the flange in the embodiment shown in FIG. 3.

Optionally, as shown in FIG. 14, second waterproof rings 214 are provided on both the inner surface of the front end of the sleeve 21 of the flange 20 and the outer surface of the back end of the sleeve 21 of the flange 20 for achieving a better waterproof effect.

Optionally, as shown in FIGS. 4 and 5, a stopper 331 is provided on the optical fibre 33 for stopping the outer casing. The stopper 331 can be a raised ring on the optical fibre or other structures, such that the outer casing will not slip toward the rear of the optical fibre endlessly during the installation of the waterproof optical fibre connector.

Here, it should note that, in the prior art, the sleeve of the flange protrudes out of the communication device, whereas the optical module within the communication device is closely adjacent to the housing of the communication device. Therefore, when the optical module needs to be replaced bare-handed on site, it is necessary to stretch one's fingers into the front end of the sleeve of the flange, hold the handle of the optical module and drag out the optical module. However, the size of the sleeve of the flange is usually defined in accordance with the size of the optical module, and it cannot accommodate two fingers. Thus the fingers are blocked by the sleeve of the flange, and it is impossible to replace the optical module bare-handed.

In contrast, as shown in FIG. 10, in the embodiments of the present disclosure, the sleeve 21 of the flange 20 is concave relative to the communication device, and the optical module extends outwards from the communication device relative to the sleeve. Thus, when the optical module needs to be replaced bare-handed, the fingers will not be blocked by the sleeve of the flange. It can be seen that, compared to the prior art, the embodiments of the present disclosure have a further advantage that the optical module can be replaced bare-handed.

It can be understood that, the sleeve of the flange can also be provided on the back face of the flange. In such a situation, a first fastening feature can be provided on the inner surface or outer surface of the sleeve, and a second fastening feature capable of cooperating with the first fastening feature can be provided on a corresponding surface of the forepart of the outer casing.

It can be known from the above that, for the waterproof optical fibre connector according to the further embodiment of the present disclosure, since the optical fibre and the outer casing are separated from each other, it also has an advantage of being compatible with optical modules having different specifications, similar to Embodiment 1. Moreover, in this embodiment, the waterproof clip is provided on the inner casing, and the waterproof clip and the optical fibre are fixed together by screwing the outer casing and the flange together to make the outer casing press against the waterproof of the inner casing. Therefore, during the replacement of the waterproof optical fibre connector, it is possible to directly unscrew the outer casing and pull it outwards but not cause the connecting component to be pulled outwards together with the outer casing, thereby protecting the connecting component from being damaged.

The embodiments of the present disclosure further provide an outdoor communication device, which includes a waterproof optical fibre connector capable of realizing the above functions.

The waterproof optical fibre connector and the outdoor communication device provided by the embodiments of the present disclosure have been introduced in detail. In this specification, some particular examples have been provided to illustrate the embodiments of the present disclosure. However, the description of the above embodiments is merely for helping understand the concept of the present disclosure. Meanwhile, one of ordinary skill in the art can make modifications to the above particular embodiments and their applications based on the concept of the present disclosure. In summary, the contents recited in this specification should not be construed as limitations to the present disclosure.

What is claimed is:

1. A waterproof optical fibre connector comprising a flange and a terminal connector, the terminal connector comprising an outer casing, an optical fibre and a connecting component coupled with the optical fibre, the optical fibre and the connecting component being housed within a chamber of the outer casing, and the flange and the outer casing being screwed together, wherein,
the connecting component and the outer casing are separated from each other,
the terminal connector further comprises an inner casing which is tubular for housing the optical fibre and the connecting component;
the outer casing is tubular for housing the inner casing;
the inner casing is housed inside the tube of the outer casing, and the optical fibre and the connecting component are housed inside the tube of the inner casing;
the inner casing comprises a body and a waterproof clip connected to a back end of the body, the optical fibre passing through the waterproof clip;
a tail of an inner wall of the outer casing tapers from the front to the back of the outer casing, and the waterproof clip is pressed inwards by the tail such that the waterproof clip and the optical fibre are fixed together; and
at least one first protrusion is provided on the inner surface of a front end of a sleeve of the flange, and a front end of the body of the inner casing bears against the first protrusion.

2. The waterproof optical fibre connector according to claim 1, wherein,
the waterproof clip is made of elastic material, and the body of the inner casing and the outer casing are made of hard materials.

3. The waterproof optical fibre connector according to claim 1, wherein,
a raised sleeve is provided on a front face of the flange, and a first fastening feature is provided on an inner surface of the sleeve of the flange; and
a second fastening feature configured to match with the first fastening feature is provided on an outer surface of a forepart of the outer casing, wherein the flange and the outer casing are screwed together by the first and second fastening features.

4. The waterproof optical fibre connector according to claim 3, wherein,
waterproof rings are provided on both the inner surface of the front end of the sleeve and the outer surface of the back end of the sleeve.

5. The waterproof optical fibre connector according to claim 3, wherein,
at least two first protrusions are provided on the inner surface of the front end of the sleeve; and
at least one second protrusion is provided on the front end of the inner casing, wherein the second protrusion is inserted into a gap formed between two adjacent first protrusions.

6. The waterproof optical fibre connector according to claim 1, wherein,
an outer wall of the inner casing contacts the inner wall of the outer casing, and a waterproof ring is provided on a middle portion of the outer wall of the inner casing.

7. The waterproof optical fibre connector according to claim 1, wherein,
a stopper is provided on the optical fibre for stopping the outer casing.

8. An outdoor communication device, comprising a waterproof optical fibre connector, wherein the waterproof optical fibre connector comprises:
a flange and a terminal connector, the terminal connector comprising an outer casing, an optical fibre and a connecting component coupled with the optical fibre, the optical fibre and the connecting component being housed within a chamber of the outer casing, and the flange and the outer casing being screwed together, wherein,
the connecting component and the outer casing are separated from each other,
the terminal connector further comprises an inner casing which is tubular for housing the optical fibre and the connecting component;
the outer casing is tubular for housing the inner casing;
the inner casing is housed inside the tube of the outer casing, and the optical fibre and the connecting component are housed inside the tube of the inner casing;
the inner casing comprises a body and a waterproof clip connected to a back end of the body, the optical fibre passing through the waterproof clip;
a tail of an inner wall of the outer casing tapers from the front to the back of the outer casing, and the waterproof clip is pressed inwards by the tail such that the waterproof clip and the optical fibre are fixed together; and
at least one first protrusion is provided on the inner surface of a front end of a sleeve of the flange, and a front end of the body of the inner casing bears against the first protrusion.

9. The outdoor communication device according to claim 8, wherein,
the waterproof clip is made of elastic material, and the body of the inner casing and the outer casing are made of hard materials.

10. The outdoor communication device according to claim 8, wherein,
a raised sleeve is provided on a front face of the flange, and a first fastening feature is provided on an inner surface of the sleeve of the flange; and
a second fastening feature configured to match with the first fastening feature is provided on an outer surface of a forepart of the outer casing, wherein the flange and the outer casing are screwed together by the first and second fastening features.

11. The outdoor communication device according to claim 10, wherein,
waterproof rings are provided on both the inner surface of the front end of the sleeve and the outer surface of the back end of the sleeve.

12. The outdoor communication device according to claim 10, wherein,
at least two first protrusions are provided on the inner surface of the front end of the sleeve; and
at least one second protrusion is provided on the front end of the inner casing, wherein the second protrusion is inserted into a gap formed between two adjacent first protrusions.

13. The outdoor communication device according to claim 8, wherein,
an outer wall of the inner casing contacts the inner wall of the outer casing, and a waterproof ring is provided on a middle portion of the outer wall of the inner casing.

14. The outdoor communication device according to claim 8, wherein,
a stopper is provided on the optical fibre for stopping the outer casing.

* * * * *